United States Patent
Janssen et al.

(10) Patent No.: US 7,282,983 B2
(45) Date of Patent: Oct. 16, 2007

(54) SECURE AND FAST CALCULATING UNIT

(75) Inventors: Norbert Janssen, Munich (DE); Tanja Roemer, Munich (DE)

(73) Assignee: Infineon Technologies AG (DE)

( * ) Notice: Subject to any disclaimer, the term of this patent is extended or adjusted under 35 U.S.C. 154(b) by 35 days.

(21) Appl. No.: 11/373,829

(22) Filed: Mar. 10, 2006

(65) Prior Publication Data
US 2007/0063742 A1 Mar. 22, 2007

(30) Foreign Application Priority Data
Mar. 11, 2005 (DE) ............... 10 2005 011 374

(51) Int. Cl.
G06F 7/42 (2006.01)
(52) U.S. Cl. .................... 327/361; 327/355
(58) Field of Classification Search ............... 327/355, 327/361
See application file for complete search history.

(56) References Cited

U.S. PATENT DOCUMENTS 6,963,644 B1 * 11/2005 Matsuzaki et al. ........... 380/30

FOREIGN PATENT DOCUMENTS

| DE | 32 28 018 A1 | 2/1983 |
| DE | 36 31 992 A1 | 11/1987 |
| DE | 102 15 785 A1 | 10/2003 |

* cited by examiner

Primary Examiner—Kenneth B. Wells
(74) Attorney, Agent, or Firm—Dickstein, Shapiro, LLP.

(57) ABSTRACT

The calculating unit includes a dual rail input stage, a switching stage for a bit to be calculated and an output stage for an output bit, wherein the output stage provides a dual rail output. The switching stage is not implemented in dual rail technology but according to a "one-hot" realization. The switching stage includes at least one internal node which is, in the preparation mode according to a control signal on a control line from a control means, connected to a reference potential, while the node potential circuit for handling the internal node in the data mode is not active. Thus, an area-efficient, cross-current-reduced and reliable calculating unit is obtained, which may additionally be clocked at high speed, as a transition form a preparation mode to a data mode takes place without time-consuming discharge processes.

9 Claims, 7 Drawing Sheets

FIG 2

| calculating potential | preparation potential | transistor technology in switching stage |
|---|---|---|
| $V_{dd}$ | $V_{ss}$ = pre-discharge | P MOS |
| $V_{ss}$ | $V_{dd}$ = precharge | N MOS |

$V_{ss} \triangleq \log.0 \triangleq 0V$ $V_{dd} \triangleq \log.1 \triangleq +5V$

FIG 3

| $C_i$ | $N_i$ | $Z_i$ | number of "1" | SUM 1 | SUM 0 |
|---|---|---|---|---|---|
| 0 | 0 | 0 | 0 | 0 | 0 |
| 0 | 0 | 1 | 1 | 0 | 1 |
| 0 | 1 | 0 | 1 | 0 | 1 |
| 0 | 1 | 1 | 2 | 1 | 0 |
| 1 | 0 | 0 | 1 | 0 | 1 |
| 1 | 0 | 1 | 2 | 1 | 0 |
| 1 | 1 | 0 | 2 | 1 | 0 |
| 1 | 1 | 1 | 3 | 1 | 1 |

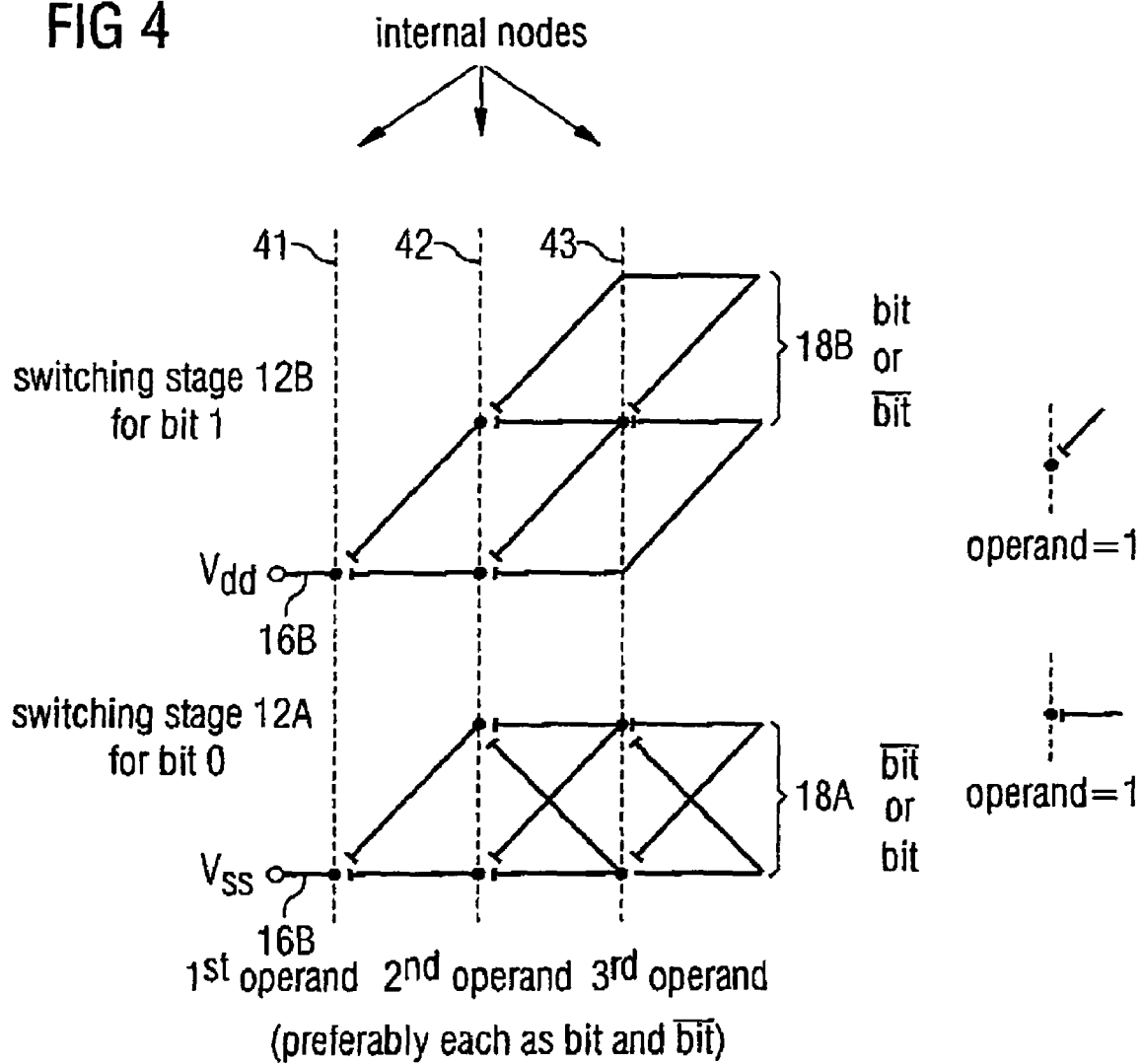

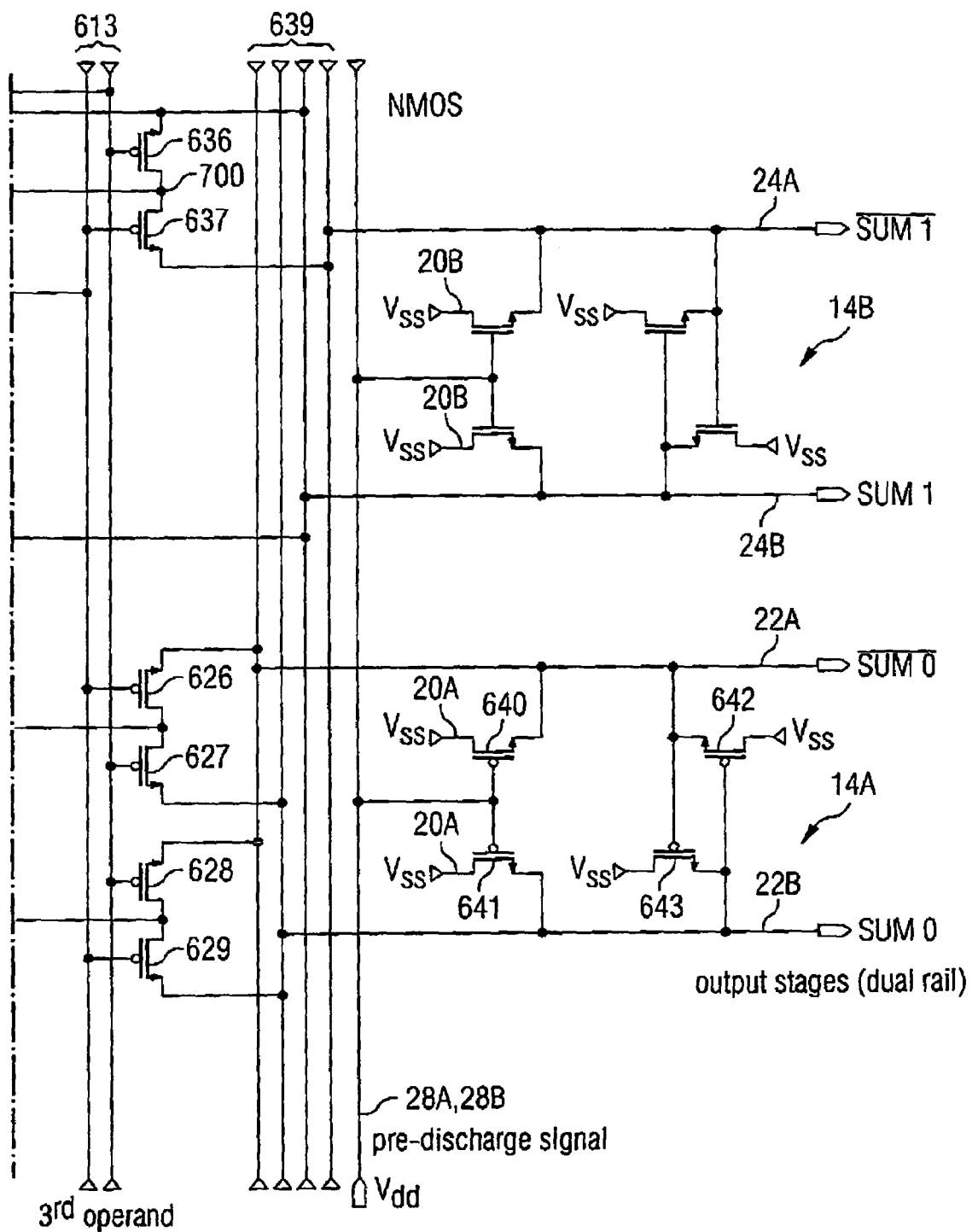

SECURE AND FAST CALCULATING UNIT

CROSS-REFERENCE TO RELATED APPLICATION

This application claims priority from German Patent Application No. 102005011374.5, which was filed on Mar. 11, 2005, and is incorporated herein by reference in its entirety.

BACKGROUND OF THE INVENTION

1. Field of the Invention

The present invention relates to calculating units and in particular to secure and fast calculating units as they may be employed in cryptography processors and in particular, in adder circuits for cryptography processors.

2. Description of Related Art

DE 3631992 C2 discloses a cryptography processor for performing the RSA public key crypto system. Here, a modular exponentiation with a base, an exponent, and a module is broken down into a plurality of three operand additions. The three operands include a module operand N, a multiplicand operand C, and an intermediate result operand Z. By a corresponding shifting/weighting of the three operands before the addition a multiplication/reduction accelerated by a multiplication look-ahead algorithm and a reduction look-ahead algorithm may be performed.

FIG. 7 shows a section from the adder unit which so to speak illustrates the heart of the cryptography processor illustrated in DE 3631992 C2. In detail, FIG. 7 shows two consecutive bit slices to calculate the two sum bits i−1 and i, that is from the three input operand bits $C_i$, $N_i$, $Z_i$ or $C_{i-1}$, $N_{i-1}$, $Z_{i-1}$ or from $C_{i-2}$, $N_{i-2}$, and $Z_{i-2}$, respectively.

The three operand addition of C, N, Z is broken down into a two-stage operation, regarded on the bit level. For executing the first stage of the operation, a three-bit half adder 80 is provided, wherein each three-bit half adder 80 has a downstream two-bit full adder 81. The three-bit half adder provides two output bits $x_i$, $y_i$, wherein the output bits $x_i$, $y_i$ are fed into the downstream two-bit full adder as it is shown in FIG. 7. In particular, in each two-bit full adder of a bit slice, the low order bit $y_i$ at the output of the three-bit half adder is combined to the high order bit of the three-bit half adder stage ($x_{i-1}$), which is lower by one order in the two-bit full adder 81, in order to calculate a sum bit 82 and a carry bit 83. The three operand addition is thus broken down into two sections. In the first section, at each binary digit a sum of the tree bits of the operands is formed. The sum may take the values of 0 to 3 (in a decimal presentation). The sum may also be presented binarily with the two bits x, y. As the sum is formed at each digit, from the two sum bits two new numbers may be put together.

In the second section, the two numbers are added in a conventional way by the two-bit full adder 81. The interconnection such that a two-bit full adder always receives two output bits from two different three-bit half adders as an input leads to a lengthening of the calculating unit by one bit.

The three operand adder shown in FIG. 7 is problematic in so far that neither a backup of input operands C, N, Z nor a backup of the "intermediate operands" x, y is provided. This is problematic in so far that in particular in the normal case in which all circuits are implemented in a CMOS logic, switching a bit from 0 to 1 or from 1 to 0, respectively, leads to a current pulse which starts when a bit state is switched. As it is known, CMOS circuits consume no current in the static state. However, in the switching state they consume current. This current consumption can be determined by a power analysis. This way, it is basically possible to derive information via C, N, Z, for example, to draw conclusions to the secret key which is used in an RSA operation.

An attacker could, for example, determine by detecting the current profile, whether a switching from 0 to 1 or from 1 to 0 took place. With an unsecured circuit, a switching of a bit would always occur when a current peak may be detected in the current profile. An attacker may thus understand the complete switching performance of a calculating unit by use of the current profile. The attacker would then only need one single bit in a complete sequence to be able to reconstruct whether a switching from a "1" to a "0" took place, or vice versa.

Certain CMOS circuits further have the characteristic that switching from 0 to 1 results in a different current consumption than switching from 1 to 0. In this case, by comparing two different current peaks, an attacker directly sees which bits were processed in the calculating unit.

As a defense measure against such power analysis attacks, it was proposed to use a so-called dual rail technology. In the dual rail technology in principle each signal path is implemented in double. On the first signal path, for example, a signal x is processed normally. On the second signal path which is integrated in the same chip not the signal x is processed but the complementary signal $\bar{x}$. This leads to the fact that always when a transition for example from 0 to 1 takes place in the signal line, in the other line, i.e. the second "rail", a complementary transition takes place. For each bit transition thus on both lines always both transitions take place. This leads to the fact that for circuits in which transitions from 0 to 1 and from 1 to 0 consume a different amount of current, it may not be determined any more, whether a transition from 0 to 1 or from 1 to 0 took place. The reason for this is that the current profile for each circuit transition contains a peak which is the overlaying of the current consumptions of the two rails. The dual rail technology provides a high security, with the disadvantage, however, that all circuits usually have to be implemented in double and that the power consumption of the complete circuit is also double as high. The circuit is, however, to a certain extent immune against power analysis attacks.

If only a dual rail technology is used, then by use of the current profile it may still be seen whether a certain bit changed from 0 to 1 or from 1 to 0, respectively, or remained the same as compared to the preceding clock cycle. In case of a bit transition, a power peak may be seen. The power peak may not be seen, however, when a bit remained for example at 1 or at 0 from cycle to the next, i.e. did not change. For defending against attacks which are based on this effect, it was proposed to supplement the dual rail technology by a precharge/predischarge mode. The circuit is alternatingly operated in a data mode and in a preparation mode (precharge/predischarge). Each data cycle has a preceding preparation cycle in which in case of precharge both rails, i.e., for example, x and $\bar{x}$ are precharged to "1", in order to then, in the data mode, feed complementary input signals to be processed into both rails. This leads to the fact that always, from data cycle to a preparation cycle or from a preparation cycle to a data cycle, exactly the same number of transitions takes place. If the preparation mode is implemented as a predischarge mode, then in the preparation mode all input data is "predischarged" to 0 and not initialized to 1 like in precharge. Then again from a preparation cycle to a data cycle and vice versa exactly the same number of transitions takes place.

As it was indicated above, for the implementation of modular operations, like e.g., addition or multiplication, for example, within the scope of cryptographic algorithms, like RAS or elliptic curves, a three operand adder is required. For the different reasons, these operations have to be performed by the adder unit securely against power attacks. As cryptographic calculations are extremely computing-intense, the adder unit has to have a high power. As in particular in cryptography long operands have to be processed, wherein the operand length with elliptic curves is in a range between 100 and 200 bits and in a range of RSA from between 1024 and 2048 bits, the calculating unit itself has a large bit length in order to meet the requirements set for the calculating unit regarding speed.

In order to make the calculating unit shown in FIG. 7, which shows a section of two bit slices of a larger calculating unit for example having 2300 bit slices, more secure against cryptographic attacks, it is first of all necessary to supply the input operands C, N, Z to the three-bit half adders 80 in dual rail technology.

An even higher security is not only to apply a dual rail technology but a dual rail technology including precharge or predischarge, respectively. Here, a data clock always alternates with a so-called preparation clock. In a data clock, for example, the bit $C_i$ is equal to 0 or 1, while the complementary bit which is supplied on the "second rail" and designated by $\overline{C_i}$ is complementary to the bit $C_i$. In a preparation clock trailing the data clock, in case of a precharge as a preparation mode a charging of both lines for example to Vdd is performed, which might for example correspond to the logic state of "1". Both dual rail lines have thus the same value in the preparation mode. In case of a discharge, both lines $C_i$ and $\overline{C_i}$ might be brought to the potential of Vss, which typically is ground potential, wherein ground potential in the present example corresponds to a logical "0". Of course, Vss may also correspond to a logical "1". Then, Vdd would correspond to a logical "0".

Logically, then the bits $x_i$ and $y_i$ or $x_{i-1}$ and $y_{i-1}$, respectively, would also have to be supplied in dual rail technology with precharge to the corresponding downstream 2-bit full adders 81, wherein again always one data clock follows one preparation clock. On the output side, then the carry bits C 83 and the sum bits 82 would also be led out of the 2-bit full adder in dual rail technology with precharge/predischarge.

Thus, it is not sufficient for an optimum security, however, that the input lines into the elements 80 and 81 and the output lines from elements 80 and 81 are implemented in dual rail technology. Instead, it is further important that also the circuits 80, 81 themselves are implanted as dual rail circuits. This may be achieved by the fact that the 3-bit half adder 80 and each 2-bit full adder 81 are present in double and implemented so that the first 3-bit half adder 80 for example calculates using the non-inverted operand bits $C_i$, $N_i$, and $Zi$ in order to obtain $x_i$ and $y_i$. The second 3-bit half adder 80 for the same bit slice would then operate using the inverted bits $\overline{C_i}$, $\overline{N_i}$, and $\overline{Z_i}$, for example to obtain the inverted output bits $\overline{x_i}$ and $\overline{y_i}$. Of course, any cross-combinations are possible, so that the first 3-bit half adder is implemented to calculate the inverted output bits from the non-inverted input bits and vice versa.

The same would have to be performed for the 2-bit full adder 81 in order to obtain an optimally secure circuit in a bit slice of a long-number calculating unit for an RSA calculation with module lengths of 1024 bits, 2048 bits, etc. Such calculating units are required for performing modular operations, like e.g. addition and multiplication, for example within the scope of cryptographic algorithms like RSA or elliptic curves. A 3 operand addition performed by the 3 operand adder, shown in part in FIG. 7, consists in adding a first addend C to a second addend Z and finally to add or subtract the module N depending on the look-ahead specification. These operations have to be performed by the adder unit secure with respect to power attacks, as it was discussed.

It is obvious that cryptographic calculations are extremely computing-intense. Thus, apart from security, there is also the requirement with regard to the calculating unit to have a high power, in so far, that it needs as little calculating time as possible, or in case of limited resources, like for example on a chip card, may still perform highly secure operations using an acceptable calculating time.

As the arithmetic of cryptographic operations is a long-number arithmetic, the calculating unit itself, as it was discussed, has a great bit length in order to reach a required power at all. Thus, it is assumed, that each bit slice corresponds to a digit of a module in so far that all digits are "mapped" in corresponding hardware bit slices. Only this maximally parallel implementation guarantees a sufficient performance in most cases.

With regard to the requested maximal parallelism and on the other hand, with regard to the costs for the chip which includes such a calculating unit, and also with regard to other limits applied to the chip area, it is strictly necessary to design the calculating unit as very space-saving. In principle, thus a high-power calculating unit is required which is apart from that secure and requires a minimal area.

The German patent DE 10307942 B3 discloses a half adder for adding bits of at least two input operands to obtain at least two output bits. Apart from an input stage, the half adder includes a plurality of switching stages and each switching stage has a downstream output stage. In a data mode, the switching stages are operable to either provide a bit or an inverted bit at an output to the output stage which is downstream from a corresponding switching stage. The output stage then changes an output bit as compared to a preceding preparation mode on the basis of the bit received from the corresponding switching stage and supplements the complementary bit from the preceding preparation mode. This half adder circuit already is space-efficient as it may operate without a complete dual rail logic and is still secure against cryptographic attacks. In particular, the input stage and the output stage are implemented in a complete dual rail circuit technology with precharge or predischarge, while the switching stages for the individual bits are implemented such that they switch a calculating potential through to the output of the switching stage according to a half adder regulation for the output bit depending on the bits of the input operands, wherein the calculating potential at the output represents the output bit or an inverted version of the output bit. This switching stage is not implemented in dual rail technology but operates according to a "one-hot" realization.

Although this circuit already is space-efficient, as the switching stages are not implemented in a complete dual rail logic, and although this circuit is energy-efficient in so far that the switching stage always respectively only calculates the inverted bit or the bit itself, i.e., consumes no current for both bits, it has turned out anyway that there may be problems in the transition from a preparation mode to a data mode.

Thus, the switching stage, depending on the occupation of its inputs, switches two VDD paths through onto the bit or the inverted bit BitQ of its two outputs, so that a logically valid number results. The switching stage has internal nodes, however, due to its special one-hot realization, which are decoupled, i.e., so to speak float in the preparation mode, i.e., when on the input side and on the output side a precharge operation or a predischarge operation is present. If such an internal node was on a high potential, i.e. charged, in the preceding data mode, then it will not automatically and immediately loose its charge due to fact that it is floating in the preparation mode. Thus it may happen, that a VDD path is switched e.g. onto the bit line of one of the result bits and that an internal residual charge which the floating node has is switched onto the inverted bit of the same result bit.

By this, a situation results in which the driven bit first has to fight against the residual charge on BitQ. Here, a cross current flows and the circuit becomes slower than necessary.

It further turned out, that this effect may be substantially increased by unavoidable coupling capacities, so that under especially unfavorable conditions not the driven bit but the residual charge so to speak wins and "turns around" the driven bit. This even leads to the fact that the calculated result is wrong.

SUMMARY OF THE INVENTION

It is the object of the present invention to provide a fast and secure calculating unit.

A calculating unit, according to one embodiment, has a dual rail input stage for receiving at least one input operand and for outputting the input operand in a non-inverted form at a fist output of the dual rail input stage and the input operand in an inverted form at a second output of the dual rail input stage in a data mode. The input stage is further implemented to bring the first and the second outputs to the same potential in a preparation mode. The unit also includes a switching stage which is implemented to switch through a calculating potential to an output of the switching stage according to a calculating regulation for an output bit depending on the at least one input operand.

The calculating potential at the output represents the output bit or an inverted version of the output bit. A dual rail output stage is provided and has an input connected to the output of the switching stage and having a first output and a second output, wherein in a data mode, the output bit is applied to the first output. In the data mode, an inverted version of the output bit is applied to the second output, and wherein in a preparation mode the first output and the second output are adapted to be brought to the same preparation potential. The preparation potential is different from the calculating potential, wherein the switching stage includes at least one internal node, which is in the preparation mode neither coupled to a potential on the first or the second input of the input stage nor to a potential on the input of the output stage. The unit also includes a node potential circuit for coupling the internal node in the preparation mode to a reference potential and for decoupling the internal node in the data mode from the reference potential.

The present invention is based on the finding, that such internal nodes, which are neither coupled to a potential from the input stage nor to a potential from the output stage in the preparation mode, may not be left in their floating states in the preparation mode but have to be controlled. According to the invention, a node potential circuit is thus provided which is implemented to couple the internal nodes to a reference potential in the preparation mode.

In one preferred embodiment, the reference potential is the ground potential or Vss, respectively, so that the internal nodes within the switching stage are now definedly discharged instead of being in their previous floating states. This leads to the fact that they definedly give off their charge and thus are optimally prepared for the next data mode. If a bit is driven in the data mode, it does not have to fight against a residual charge present on the complementary bit but can go ahead freely.

Thus, on the one hand, the cross current is prevented. On the other hand, such a circuit may be clocked faster, as when clocking the circuit, times do not have to be considered any more which were otherwise needed for a stable state to establish, i.e., for the driven bit to operate successfully against the residual charges. Further, it is guaranteed in any case that no wrong result is obtained due to the described coupling capacity effect.

The calculating unit of the present invention which has no reduced performance loss, no cross current and not lack of reliability any more. The defined handling of the internal bits further has a substantial security advantage. Thus, according to the invention, it is guaranteed by coupling the internal nodes to a reference potential, that the internal state of the switching stage is set equally in each cycle. This leads to a complete independence of the current profile of the input data.

In a preferred embodiment, a discharge of the internal nodes of the switching stage is performed which operates according to a half adder regulation so that a half adder according to the present invention is obtained.

The half adder is area-saving in so far that the switching stage only has to calculate one output bit, wherein it depends on the implementation whether the switching stage provides the output bit itself or the inverted version of the output bit. It is obvious, that the requested information is contained both in the output bit and also in the inverted output bit.

The corresponding complementary bit which is not calculated by the switching stage is then generated in the output stage, i.e., already in the preparation mode, i.e., in the precharge or predischarge mode, respectively. Depending on the implementation, then in the data mode only one output bit of the output stage, i.e., either the output bit itself or the inverted version of the output bit is re-charged compared to the precharge state, so that in the data mode the half adder outputs a bit which was calculated by the switching stage and was re-charged compared to the precharge mode, while the other bit in the data mode has the same value as in the preparation mode and was already generated in the preparation clock preceding the data clock.

The circuit of the present invention is space-saving in so far that the switching stage calculates the inverted bit or the non-inverted bit, depending on the implementation, and does not have to calculate both bits. The second bit is then generated in the dual rail precharge/predischarge output stage.

The present circuit is further advantageous in so far that it may be implemented with few transistors. This is the case when the switching stage is implemented such that through the same the calculating potential, depending on the three input operands, switches through to an output on one of different paths. It is preferable to take the same number of transistors for each path branching, so that each path that may be implemented by the switching stage results in the same number of transistor switchings from the calculating potential to an output, so that it is not obvious from the outside using the power profile which path the switching stage has taken. It is thus not obvious regarding the current consumption which input operands were applied in the current calculating cycle.

The present circuit is further advantageous in so far that it enables a high flexibility. Thus, for each output bit an individual switching stage is provided. A current security is already achieved when the number of transistors in one path in a switching stage is equal to the number of transistors of other paths in the same switching stage. There is, however, no equality of transistors necessary from one switching stage to the next switching stage. Thus, any half adder regulations may be implemented for individual bits without a transistor overhead being present in so far that e.g. all switching stages have to include the same number of transistors.

By the implementation of any half adder regulations with regard to the encoding of the half adder result on the output side (binary weighting, gray code, decimal weighting, etc.), thus always an optimal switching stage may be found which is designed with few transistors.

In addition to that, the present circuit is cross-circuit-reduced and in the ideal case even cross-current-free, as always only recharging operations from one single output node of the output stage are required. Thus, always one output bit is already calculated in the preparation mode so to speak on speculation, while in the data mode only one single bit of the two output bits of one output stage has to be recharged. This recharging takes place without a cross current from the high potential (e.g. Vdd) to the low potential (Vss) and additionally includes a low current consumption as compared to the case in which always two output bits have to be re-charged. The present circuit is thus not only cross-current-reduced but also favorable with regard to its overall current consumption, which is an advantage in particular for applications in which for example a chip card has no self-sufficient voltage supply in the form of a battery, like e.g., contactless applications.

The present circuit may further be favorably implemented, as the individual stages do not have to be implemented in a complete CMOS technology. Instead, for the individual stages either only NMOS transistors or PMOS transistors are sufficient. Both transistor types are, however, not necessarily required in all stages, as it is the case in a complete CMOS design in which a PMOS transistor always has an associated corresponding complementary transistor (NMOS transistor).

The present circuit is further flexible in so far that the calculating potential, which is switched through the switching stage to an output according to the input operands, may be the high potential Vdd or the low potential Vss. If the high potential Vdd is selected for the calculating potential, then for the preparation potential in the output stage the other potential, i.e., in the present case the low potential Vss, has to be used. If, however, in the switching stage the low potential Vss is used as a calculating potential, then in the output stage a preparation potential has to be used which is different from the calculating potential. In the latter case, this would be the high potential Vdd.

The present half adder thus contributes to a secure, high-power and minimum-space 3 operand adder. The operands applied to the 3 operand calculating unit are typically stored in memory elements, like e.g., SRAM cells, and are fed to the calculating unit in a dual rail implementation in order to obtain a security against power attacks. As the full adder which follows the half adder may be implemented compactly in a dual rail precharge logic, also the connections between the half and full adder may in turn be implemented in dual rail logic with precharge/predischarge technology. The minimum-space and secure half adder of the present invention is based on the "one-hot" realization. For each applied bit pattern in each switching stage exactly one path is switched. In the case of two output bits, thus for each bit pattern of the three applied operands two paths are switched. These two paths are necessary to calculate one bit each for the output stage, while the other bit is generated so to speak by the output stage itself, i.e., is "taken over" from the preceding preparation mode. For any applied bit pattern at the input the total sum of the capacities to be re-charged is equal. Thus, the applied bit pattern may not be detected from the outside during the switching processes in the half adder.

According to the present invention, it is preferred to equip the paths to be switched with as few transistors as possible for achieving a power as high as possible. This may be performed randomly and individually for each switching stage depending on the half adder regulation, so that one switching stage which has a more complex half adder regulation does not so to speak "dictate" the transistor number for another switching stage which has a less complex half adder regulation.

The present half adder is used in its preferred form as a 3 operand adder having three input operands in order to generate two output bits in a binary weighting. By a series connection of several such 3 operand adders, any N operand adders may for example be employed for performing not only a three-fold but an N-fold ZDN algorithm. With such an N operand adder, set up from several series-connected 3 operand adders, the performance per chip area may again be increased, i.e. with an area overhead which is underproportional with regard to the performance gain.

The present half adder, however, also has the potential to be employed as a direct N operand adder without the use of series-connected 3 operand adder elements, by employing other half adder regulations for example for more than two output bits e.g. according to corresponding truth tables for a 7 operand adder, for example. A 7 operand adder for example has a maximum of seven ones if all seven input operand bits are equal to 1. The decimal number 7 may be presented by a total of three output bits in a binary weighting. A 7 operand half adder would thus already get by with three output bits.

BRIEF DESCRIPTION OF THE DRAWINGS

Preferred embodiments of the present invention will be detailed subsequently referring to the appended drawings, in which:

FIG. 2 shows a table for possible combinations of the calculating potential, the preparation potential and a corresponding transistor technology;

FIG. 3 shows a truth table for a 3 operand half adder having two output bits SUM1 and SUM0;

FIG. 4 shows a schematical illustration of switching stages having different calculating potentials;

FIGS. 6A and 6B show a block diagram on the transistor level for a preferred half adder according to the present invention having a dual rail input stage, two switching stages and two dual rail output stages;

DESCRIPTION OF THE PREFERRED EMBODIMENTS

In the following, with reference to FIGS. 1 to 6C, the present invention is illustrated with reference to a half adder. It is to be noted, however, that the present invention can be applied to any calculating units which, for calculating, operate on the basis of a switching stage which is not implemented in full dual rail which calculates only one single output bit according to an adder regulation by connecting the output bit or the inverted output bit to the calculating potential, depending on the calculating regulation, while the complementary bit is then added in a corresponding output stage, i.e., is so to speak taken over from the preceding preparation clock and if applicable stabilized accordingly. In particular, the present invention may be applied in every calculating unit with such a switching stage, if the switching stage includes at least internal node which is coupled neither to a potential of the input stage nor to a potential of the output stage in the preparation mode.

Figure 1:
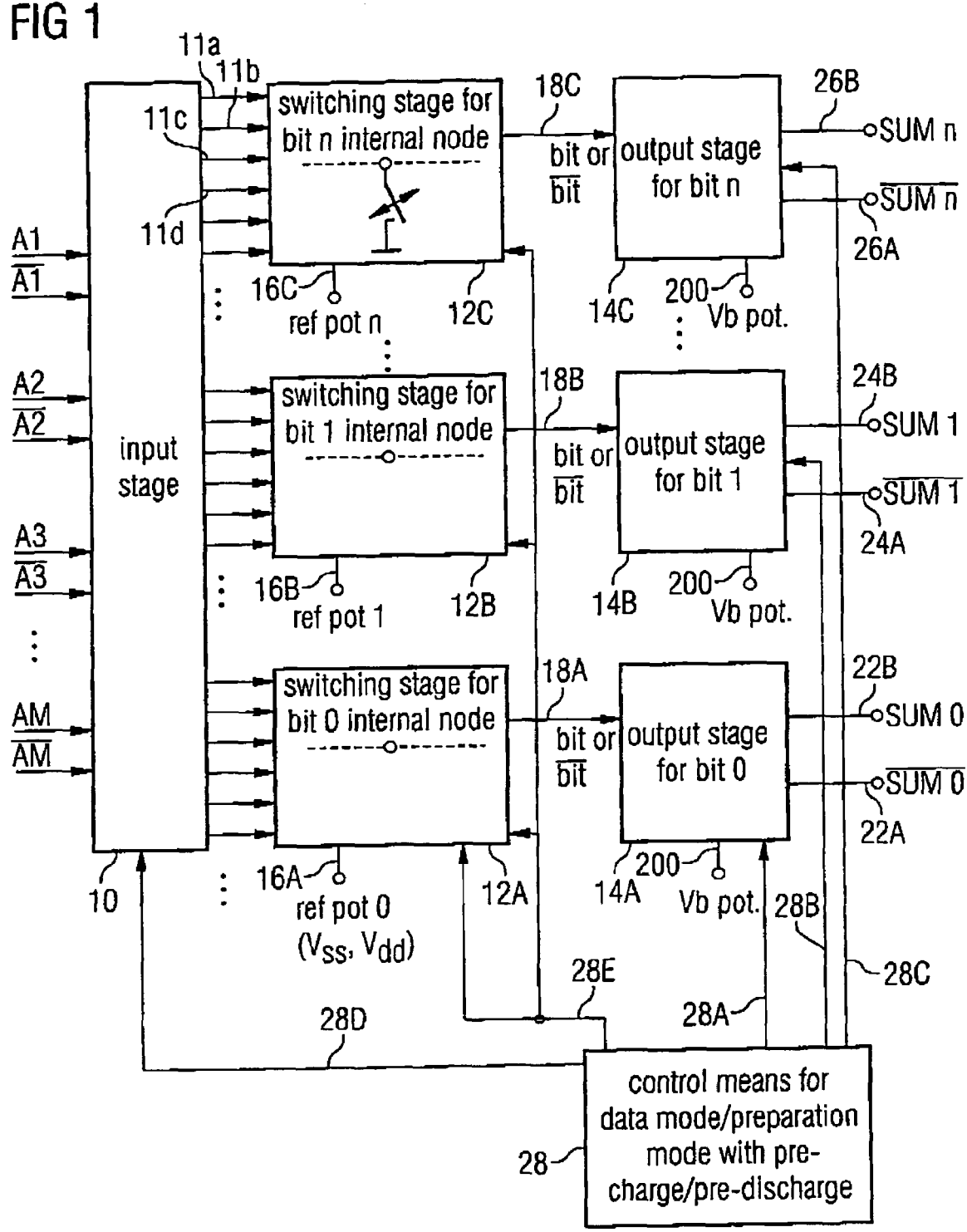
FIG. 1 shows a circuit diagram of a half adder with a random number of input operands and a corresponding number of output bits.
Figure 6A:
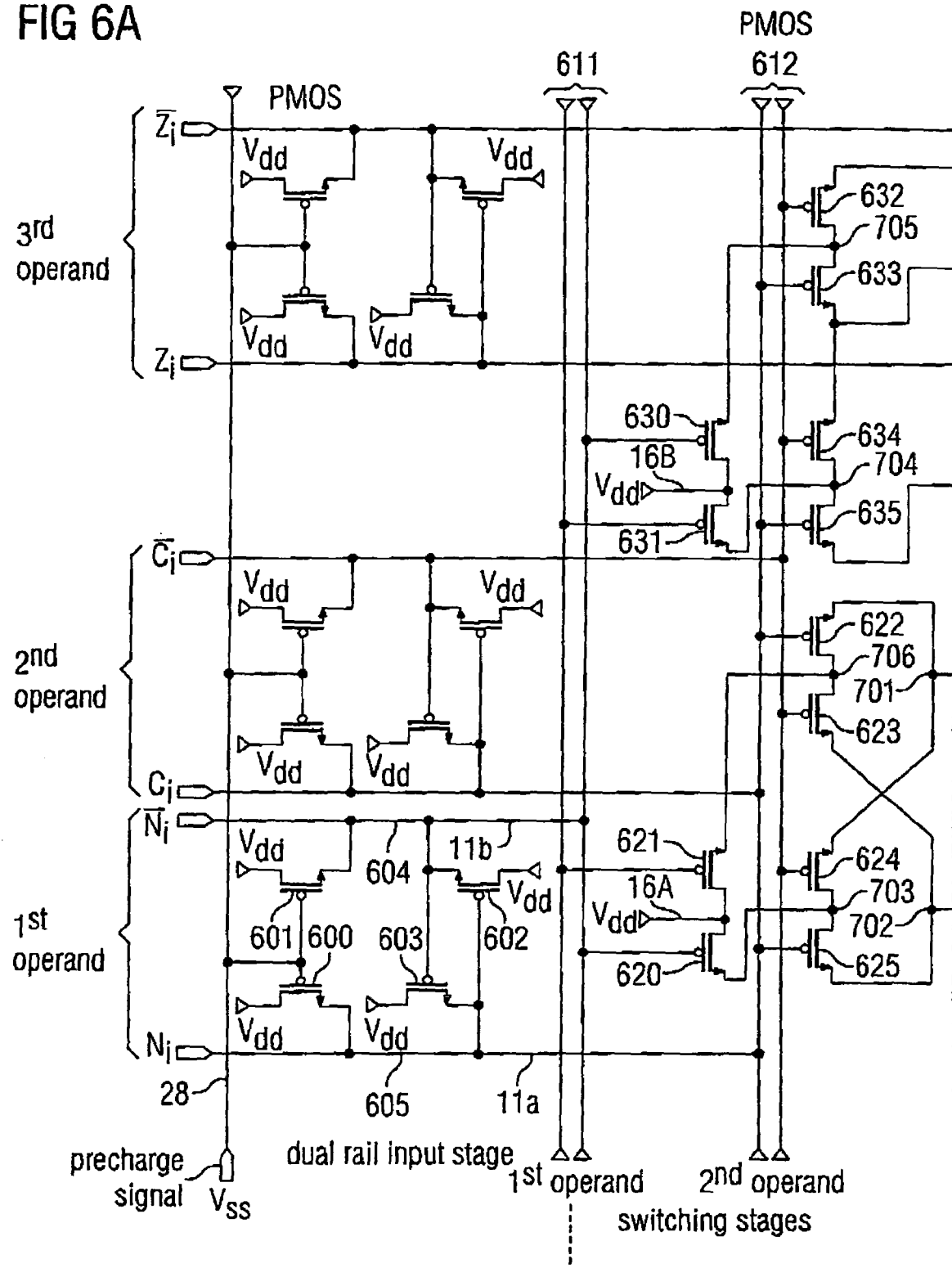

FIG. 1 shows a schematical block diagram of a half adder according to the present invention for adding bits of several input operands which are illustrated in FIG. 1 such that they are supplied to an input stage 10. The M input operands are designated by A1, A2, A3 . . . , AM in FIG. 1. In FIGS. 6A and 6B, then, for example, only three input operands are regarded which are designated by C, N, Z. A random number of input operands may be supplied to the input stage 10. Further, the input stage is implemented as a dual rail input stage, i.e., receives for each input operand also the complementary version of the same.

The input stage is primarily operable to distribute the input operands and the complementary input operands to n switching stages 12a, 12b, 12c shown in FIG. 1. For each switching stage, the input stage also has outputs, wherein the number of outputs is double as high as the number of input operands. For the switching stage for bit n in FIG. 1, the input stage thus has a first output 11a which the operand A1 passes, and a second output 11b which the operand which is complementary to A1 passes. A2 passes a third output 11c and the operand complementary to A2 passes a fourth output 11d, etc.

It is further to be noted that M and n are different. If M is equal 1, then n=1. If M is 2 or 3, then n=2. If M is between 4 and 7, then n=3. If M is between 8 and 15, then n=4.

The switching stage 12a is associated with the output bit 0 also designated as bit SUM0. The complementary bit $\overline{SUM0}$ is also illustrated at the output side in FIG. 1. The switching stage 12b is associated with the output bit 1, also designated as bit SUM1. The complementary bit $\overline{SUM1}$ is also illustrated at the output side in FIG. 1. The switching stage 12c is provided for the output bit n. The same is also designated as bit SUMn. The complementary bit $\overline{SUMn}$ is also illustrated at the output side in FIG. 1. Each switching stage 12a, 12b, 12c has an associated output stage 14c as it may be seen in FIG. 1. In particular, the output stage 14a is downstream from the switching stage 12a for the bit 0. The output stage 14b is downstream from the switching stage 12b for the bit 1. The output stage 14c is downstream from the switching stage 12c for bit n.

As it may be seen from FIG. 1, further a calculating potential can be supplied to each switching stage for this switching stage, as it is illustrated by the calculating potential terminals 16a, 16b and 16c. In principle, an individual calculating potential can be supplied to each switching stage, which in a preferred embodiment is either a high potential Vdd or a low potential Vss. For reasons of circuit implementation it is preferred, however, to supply the same calculating potential 16c, 16b, 16a to each switching stage, which is either Vss or Vdd. If there is the possibility that the implemented circuit has more than two potentials, then also calculating potentials deviating from Vss or Vdd, respectively, may be supplied to the switching stages 12a, 12b, 12c.

The switching stages 12a, 12b, 12c are operable to supply the calculating potential 16a, 16b, 16c supplied to the same to an output 18a, 18b, 18c, wherein the voltage potential supplied to the output 18a, 18b, 18c represents the output bit or an inverted version of the output bit.

At this point, it is to be noted that the output bit is regarded as a logical bit, i.e., as a logical "0" or a logical "1". If the calculating potential 16a is supplied to the output 18a of the switching stage 12a due to a conductive connection from the input 16a to the output 18a formed by the switching stage 12a, then the voltage value applied at the output 18a may either represent the logical output bit SUM0 of the downstream output stage 14a or may represent the inverted bit $\overline{SUM0}$, depending on the selected implementation.

As an input signal, the output stage 14a receives the signal on the output 18a of the switching stage and as a further input signal it receives a preparation potential at a terminal 20a. The situation for the output stages 14b and 14c is accordingly, which receive their preparation potentials via inputs 20b or 20c, respectively. Each output stage includes two outputs 22a, 22b. Accordingly, the output stage 14b for bit 1 also includes two outputs 24a, 24b. Analogously, also the output stage 14c for bit n includes two outputs 26a, 26b. The output 22a of the output stage 14a for the bit 0 provides the inverted output bit $\overline{SUM0}$. Accordingly, the output 22b of the output stage 14a provides the non-inverted output bit SUM0.

The half adder shown in FIG. 1 further includes a control means 28 for setting a data mode and a preparation mode, wherein in the preparation mode either a precharge mode or a predischarge mode may be run. The presence of a data mode or a preparation mode, respectively, is signalized to the output stages 14a, 14b, or 14c, respectively, by control lines 28a, 28b, 28c. Optionally, the input stage 10 is also operable in the data mode or the preparation mode, respectively. The control means 28 signalizes this to the input stage via a further control line 28d.

In the data mode, at an output of an output stage, the output bit is applied in a non-inverted form, i.e. SUM0, SUM1 or SUMn, respectively. At the other output in the data mode an inverted version of the output bit is applied, i.e. $\overline{SUM0}$, $\overline{SUM1}$ and $\overline{SUMn}$, respectively.

The output stages are further operable to apply the same preparation potential at one output and at the other output, which is supplied to the output stage via the corresponding input 20a, 20b or 20c, respectively, in a preparation mode, wherein according to the invention, the preparation potential, supplied to an output stage for example via the input 20a, is different from the calculating potential which is supplied to the switching stage upstream from the regarded output stage e.g., via the input 16a. The preparation mode is signalized to the individual output stages from the control means 28 via the control lines 28a, 28b or 28c, in the embodiment shown in FIG. 1.

In the switching stages 12c, 12b, 12a an internal node is further shown schematically, which is in the preparation mode coupled to no potential both on the input side and also on the output side and thus floats in the preparation mode. The node potential circuit according to the present invention is implemented to connect each of those internal nodes to a reference potential in the preparation mode, which is preferably the ground potential. For this purpose, the control means 28 includes a further control line 28E which is coupled to each switching stage and in particular to each discharge switch for each internal node in the corresponding switching stages. A signal is provided to the control line 28E which is synchronous to the signals on the control lines 28A to 28D, wherein depending on the implementation of the switches and the preparation mode, in the input stage and the corresponding output stage preferably the same signal is used. Depending on the implementation of the switches of the node potential circuits, however, also signals which are complementary to each other may be used e.g., on line 28E and line 28D.

In the following, with reference to FIG. 2, reference is made to preferred combinations of calculation potential, preparation potential and transistor technology. If the high potential Vdd is supplied to a circuit as a calculating potential of a switching stage (input 16a), then the preparation potential different from the downstream output stage is the low potential Vss. Supplying the low potential Vss as the preparation potential leads to a predischarge in the output stage (e.g. 14a), so that in the preparation mode both bits SUM0, $\overline{SUM0}$ have a low voltage state and thus present a logical "0" in the example illustrated here.

In the data mode, from the switching stage 12a then the high calculating potential Vdd of the output stage 14a is supplied as bit SUM0 or bit $\overline{SUM0}$, i.e. depending on the bit pattern of the three input operand bits, so that then, in the data mode, only one output bit SUM0 or $\overline{SUM0}$ is recharged, respectively, i.e. changed from the logical state "0" into the logical state "1".

In the case in which Vdd is taken as a calculating potential and Vss is taken as a preparation potential, as the transistor technology the PMOS technology is preferred, as the PMPS transistors switch through a high calculating potential in a better way.

If, however, in another case the low potential Vss is taken as the calculating potential, and if then to be consequent the high potential Vdd is taken as the preparation potential, then in the output stage a precharge mode takes place in so far that the two output bits SUM0, $\overline{SUM0}$ of the output stage 14a for example represent a logical "1". Through the switching stage, the low potential Vss is supplied to the output stage 14a either as bit or $\overline{bit}$, which then only re-charges one of the two output bits SUM0 or $\overline{SUM0}$ into the low state, i.e. changes the same from a logical "1" to a logical "0". In this case, in the switching stage the NMOS technology is preferred as a transistor technology, as the same is best suitable for switching through low voltage potentials.

FIG. 3 shows a preferred half adder regulation for a 3 operand adder in a tabular form to calculate corresponding output bits SUM1, SUM0 for each bit pattern of the input operands $C_i$, $N_i$, and $Z_i$. The half adder regulation in FIG. 3 is implemented as a "ones counter", wherein the number of ones is illustrated by the bits SUM0, SUM1 in a binary weighting. The output bits SUM1 and SUM0 thus present a binary number, wherein the bit SUM1 is the MSB of this binary number, and wherein the bit SUM0 is the LSB of this number. The two output bits SUM1 and SUM0 thus represent the number of ones of each bit pattern of the input operands in a binary encoding. Only in the case in which all three input operands have a logical "1", both bits SUM 1 and SUM0 are set, which corresponds to the binary number "11", which is equal to the number 3 in decimal presentation.

It is obvious for a person skilled in the art, that using the systematic of FIG. 3, any N operand half adders may be set up. If, for example, a 7 operand half adder is set up, then for representing the maximum case in which all seven operands have a logical "1", a number of three output bits is required, as the binary number "111" corresponds to the decimal number "7".

For half adders having a greater number of seven operands, thus correspondingly more output bits are required when the normal binary weighting is employed.

From the systematics of FIG. 3, it may further be seen that also another encoding may be used if it is advantageous for a special case. Thus, the meaning of the bits SUM1, SUM0 may be set arbitrarily in so far that a bit combination of SUM0 and SUM1 being "111" e.g. indicates that the number of zeros in the input bit C, N, Z is equal to 3, which is equivalent to the fact that the number of ones in C, N, Z in the certain regarded bit combination is equal 0.

The lines 41, 42 and 43 present potential node levels whose branchings may be realized by corresponding transistors in the switching stage. These transistors lead to internal nodes which are decoupled both from the input and from the output in the preparation mode and are, according to the invention, connected to the reference potential by an additional node potential circuit in the preparation mode, wherein the reference potential is preferably the ground potential.

The reference potential does not necessarily have to be the ground potential, however. Depending on the preparation mode, i.e., whether a precharge operation or a predischarge operation is used, and depending on the circuit implementation, i.e., whether the bit itself of the inverted bit is driven, the reference potential may also be the high potential, i.e., Vdd.

In the following, with reference to FIGS. 5a and 5b, two respectively different paths are represented by the individual switching stages for the different bit patterns.

Figure 5A:
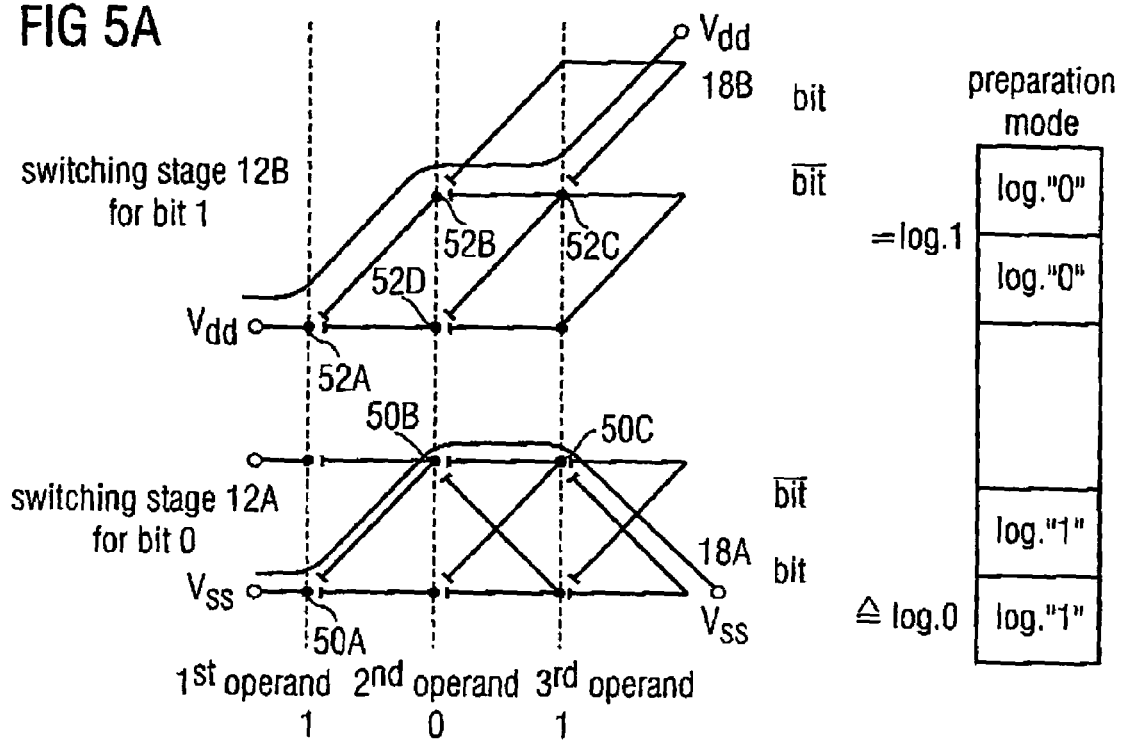
FIG. 5a shows an example for paths through the switching stages for a certain operand bit pattern.

In FIG. 5a, as an example the case is shown, in which the first operand is equal to 1, the second operand is equal to 2, and the third operand is equal to 1. For the switching stage 14a this means, that a first switching node 50a is passed, so that a 45° branching is taken, as the first operand is equal to 1. A second switching node 50b is processed so that the path is continued horizontally, as the second operand is equal to 0. A third switching node 50c is passed so that again a 45° branching is taken as the third operand is equal to 1. This leads to the fact that the calculating potential Vss determines the non-inverted bit of the switching stage on the output side. In the data mode, a voltage state Vss for the non-inverted bit leads to the fact that the output stage 14b downstream from the switching stage 14a, which had both outputs 22a, 22b in a state "1", discharges the non-inverted bit SUM0 (22b) into the low state, while the inverted bit SUM0 22a remains in the high state.

The switching stage 14b has the high potential Vdd as a calculating potential. In a first branching node 52a, a 45° branching is taken. In a second branching node 52b corresponding to the second operand, a horizontal branching is taken. In a third branching node 52c corresponding to the third operand, a 45° branching is taken, so that finally at the output 18b which corresponds to the non-inverted bit the high voltage potential Vdd is applied. The high voltage potential at the output 18b leads to the fact that in the output stage 14b of FIG. 1, the non-inverted bit SUM1 24b is set from its low state, which it had in the preparation mode, to the logically high state, while the inverted bit $\overline{SUM1}$ may remain in the state consisting since the preparation mode, i.e. the low state "0".

It may be seen from the above description that the switching stage only has to calculate one bit, i.e., the inverted or the non-inverted bit, respectively, while the second bit is then taken over by the output stage from the preceding preparation mode.

It may further be seen, that e.g., in the switching stage 14a in FIG. 5a, eight different paths according to the eight different combinations of the three input operands may be selected. As it may be seen from switching stage 14b of FIG. 5a, however, the case in which already the first input operand and the second input operand were equal to 0, i.e., in which the path is continued horizontally at a branching node 52d, results in the fact that no individual branching point is associated with the third operand any more. This may easily be seen from the fact that in the case in which already the first and the second operands were equal to 0, at most one single 1 may be among the three operands, i.e., the 1 of the third operand, which in any case leads to the fact that the bit SUM1, as it may be seen from the truth table, is equal to 0. The high potential Vdd thus determines the state of the inverted bit $\overline{bit}$ to be a logical "1", such that in the data mode the non-inverted bit is equal to 0, as it is requested by the truth table of FIG. 3.

Figure 5B:
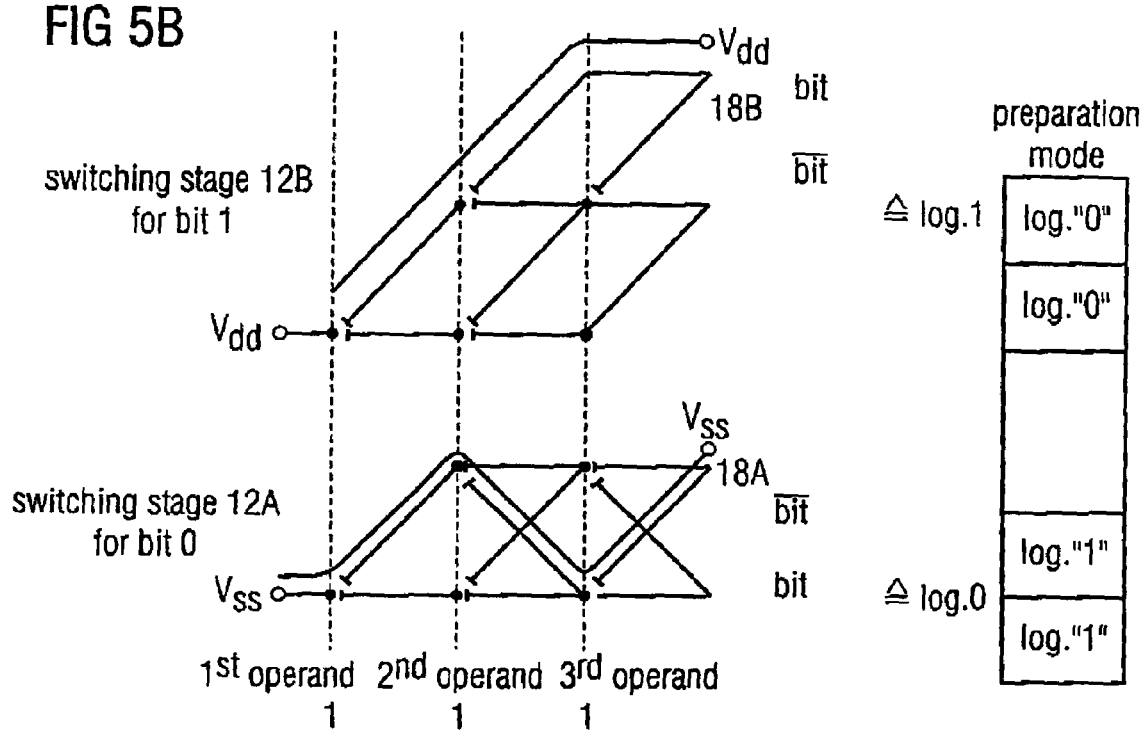
FIG. 5b shows an exemplary illustration of different paths through switching stages for an alternative operand bit pattern.

In FIG. 5b, an alternative bit combination of the three operands is illustrated, i.e., the case in which all three operands are equal to 1. In the switching stage 14a, the path plotted in FIG. 5b is taken, which includes only 45° branches. The path finally ends so that the low potential Vss representing a logical "0" is applied to the inverted bit $\overline{bit}$. In the switching stage 14b, it is obvious already regarding the first two operands, that the bit has to be set so that the result, i.e., Vdd at the non-inverted output 18b of the switching stage, does not depend on the third operand any more, so that no individual branching point has to be associated with the third operand any more.

It may further be seen from FIGS. 5a and 5b, that the number of branching points, i.e., four in the switching stage 14b and five in the switching stage 14a, does not have to be identical for each switching stage. Rather, a switching stage with as few branching points as possible is desired, as the number of branching points finally determines the number of the transistors in the switching stage and thus the valuable chip space. One security measure against power attacks is already achieved by the fact, however, that each path through a switching stage includes the same number of branching points, wherein, however, the number of branching points does not have to be necessarily equal from switching stage to switching stage. Such a disparity only provides the one piece of information for the attacker that a switching was performed in two switching stages. This piece of information is not of any use for the attacker, however, as this fact is clear anyway. An attacker may not detect, however, which path was switched through in a switching stage in order to maybe be able to conclude the values of the three input operands.

For reasons of clarity, in FIGS. 5a and 5b on the right hand side also the associated preparation mode is illustrated which is determined by the preparation potential associated with an output stage which is different from the calculating potential according to the invention. Thus, the switching stage 14b has the consequence due to the high calculating potential Vdd that the associated output stage has a different preparation potential, i.e., the low potential Vss, if the circuit only makes two different potentials available.

Analogous to that, based on the low calculating potential Vss, the switching stage 14a results in a high preparation potential.

In the following, regarding FIG. 6, reference is made to a preferred embodiment of the present invention on the transistor level.

In FIGS. 5A and 5B, again branching nodes 52A to 52D or 50A to 50A, respectively, are plotted which will again lead to internal nodes which are brought to a defined reference potential state by the node potential circuit.

FIGS. 6A and 6B together show in a module-like illustration preferred transistor implementations of a dual rail input stage (block 10 of FIG. 1), of switching stages (blocks 12a, 12b of FIG. 1) and output stages (blocks 14a, 14b of FIG. 1), wherein here the concept of the present invention is described with reference to a half adder implementation, as it is presented in the German patent DE 10307942 B3. It is to be noted, however, that instead of a half adder regulation, as they are realized by the switching stages in FIGS. 6A and 6B, also a different calculating regulation may be implemented, like for example a full adder calculating regulation, an inverter calculating regulation or any other logical and/or arithmetical calculating regulation. Further, it is to be noted, that the present invention is not limited to three input operands but is applicable to any number of input operands, i.e., also to only one single input operand. In the latter case, the calculating regulation would e.g., be an inverter regulation, which is implemented such with regard to the corresponding switching stage that at least one internal node exists which is decoupled in the preparation mode both on the input side and also on the output side and thus floats, i.e., may have residual charges, which may in an unfavorable case, i.e., without the principles of the present invention, lead to a circuit deceleration, to cross currents and even to a corruption of results.

In the following, reference is made to the implementation of the dual rail input stage (block 10 in FIG. 1). The dual rail input stage in FIG. 6 first of all includes six inputs for the three operands Z, N and C as non-inverted bits and inverted bits. The bits are supplied to the dual rail input stage as it may be seen in FIG. 6. The input stage further includes, as it is indicated by line 28d in FIG. 1, a precharge signal Vss, in order to drive the input stage in the preparation mode into a precharge state in which all six inputs are brought to the same potential. This potential is, as it may be seen with reference to the voltage supply situation in FIG. 6, the high potential, as the dual rail input stage is supplied with the high potential Vdd at different locations.

For triggering the precharge state, i.e., in the preparation mode, the transistors implemented as PMOS transistors in FIG. 6 are provided with the low potential Vss at their gates, so that they switch through, as it may be seen from FIG. 6, to lay all operand bit nodes and all nodes for inverted operand bits onto the potential Vdd.

In particular, each dual rail input stage includes four transistors 600, 601, 602 and 603, wherein in the following merely as an example and representative for the second and the third operands, the input stage associated with the third operand is presented. In the preparation mode in which the precharge signal is active, i.e., in which Vss is applied to line 28d, the two transistors 601, 600 serve to lay the high voltage Vdd applied to the one side of the two transistors to the output nodes 604, 605 for the inverted first operand bit and not the non-inverted first operand bit. Thus, the two transistors 603, 602 are directly blocked, as they have the high potential Vdd at their respective gate terminals.

In the data mode, however, line 28d is at the high potential Vdd which leads to the fact that the two transistors 601 and 600 are ineffective. The two transistors 602, 603 serve for stabilizing the conditions in the data mode. If, for example, the operand bit $N_i$ is high, then the transistor 602 is blocked, so that the potential Vdd on the one side of the transistor 602 may not get to the node 604. The node 604 is, as it represents the inverted bit $\overline{N}_i$ of the first operand, at a low potential. This low potential leads to the transistor 603 being opened. In the ideal state, however, no current flows as the node 605 is also at Vdd. The transistor 603, however, serves for stabilizing and if applicable re-charging the high potential on the node 605 if leak currents occur at any location.

The dual rail input stage thus serves to generate equal potentials on the bit lines in the preparation mode and to stabilize the states on the bit lines in the data mode. In addition, the dual rail input stage serves to distribute the operand bits to the switching stages via distribution rails 611, 612 and 613. For each operand or complementary operand, respectively, the dual rail input stage includes a first output 11a or a second output 11b, respectively.

As it is shown in FIG. 6A and FIG. 6B, the two switching stages are implemented such that they have the high potential Vdd supplied as a calculating potential, as it is indicated by the voltage supplies 16a for the first switching stage and 16b for the second switching stage. Thus, the switching stage for the bit 0 or for the bit for generating the bit 0 (SUM0 22b or $\overline{SUM0}$ 22a), respectively, consists of an overall of ten transistors 620-629, wherein always two transistors together form a branching point of the branching points shown in FIGS. 5a and 5b. Analogue to this, the switching stage for the bit 1 (SUM1 24b or $\overline{SUM1}$ 24a), respectively, consists of only eight transistors 630-637, wherein transistors arranged in pairs also always define one branching point.

It is further to be noted, that the situation of the calculating potential 16a, 16b corresponds to the high potential Vdd of the situation which includes the switching stage 12b in FIGS. 4, 5a and 5b. In particular, the transistors 630 and 631 correspond to the branching point 52a. The transistors 632, 633 correspond to the branching point 52b of FIG. 5a. The two transistors 634 and 635 correspond to the branching point 52d in FIG. 5a. Finally, the transistors 636 and 637 correspond to the branching point 52c.

Analogue to this, in the switching stage for the bit 0, the two transistors 620 and 621 correspond to the branching point 50a of FIG. 5a. The transistors 622, 623 correspond to the branching point 50b of FIG. 5a. The transistors 626 and 627 correspond to the branching point 50c of FIG. 5a.

The switching stages further include an output rail shown in FIG. 6 at 639, which simultaneously represents the input rail for the downstream output stages. The two right-hand lines of the output rail 639 are associated with the top output stage 14b, while the two left-hand lines of the output rail 639 are associated with the bottom output stage 40a. It is to be noted, that the transistors in the switching stages are operable to only switch through one path from terminal 16a or 16b, respectively, to one of the lines of the output rail 40. It is further obvious that each path includes the same number of transistors independent of which path is set by a switching stage depending on the bit pattern.

It may further be seen from FIG. 6, that in the embodiment shown, one branching point is implemented in addition to the non-inverted operand bit by using a complementary operand bit. This enables a simple implementation is so far that only two transistors are used and that no checking of the bit in so far is required whether the bit includes a 0 or a 1. Alternatively, however, although it is not preferable with regard to the implementation and possible security losses, an implementation could be used in which only single rail operands are supplied to the switching stages. In this case, each branching point would include one additional means in order to examine whether the supplied bit is a 0 or a 1, in order to switch through a corresponding path. In this case, the half adder could also be used for a single rail—dual rail conversion in order to convert single rail data present on the input side into dual rail data on the output side, wherein the dual rail data on the output side were further derived from the single rail data on the input side according to the half adder regulation.

The functionality of the two transistors functioning as switches, for example 620 and 621, representing the branching point 50a in FIG. 5a, is obvious if it is assumed that in the data mode, always only one transistor switches through, while the other transistor inhibits or blocks, so that always only one path either to the top or to the bottom is taken, never two paths at the same time, however. As in the data mode the two nodes 605 and 604, i.e., the two bits representing the first operand in the data mode, are at Vdd, the two transistors 620 and 621 in the preparation mode are both blocked, so that no cross currents may flow. The switching stage is thus, due to the fact that in the input stage a precharge is used and in the switching stage PMOS transistors are used, automatically deactivated in the preparation mode in so far that no cross currents may flow from node 16a or 16b, respectively. If the dual rail input stage was subjected to a discharge operation, it would be preferred to run the transistors of the switching stages in NMOS technology with a corresponding calculating potential (in this case Vss).

In the following, the transistor implementation of the output stage 14a is discussed as an example, which includes an overall of four transistors 640, 641, 642 and 643. As as the calculating potential 16a, 16b the high potential Vdd is taken, in FIG. 6 as a preparation potential the low potential Vss 20a is used. Accordingly, also in the second output stage 14b the low potential Vss is used as a preparation potential, i.e. a potential which is different from the calculating potential Vdd.

The output stages 14a, 14b are provided with a predischarge signal in the preparation mode which is a high voltage signal Vdd due to the implementation of the transistors 640-643 in NMOS technology. In the data mode, on line 28a, 28b, however, the low potential Vss is applied to block the discharge transistors 641, 640.

If the output stage 14a (just like the output stage 14b) is operated in the preparation mode, however, then Vdd is applied to lines 28a, 28b (which are implemented as a common line in the actual implementation). This causes the two nodes 22a, 22b to be at Vss, as the two transistors 640, 641 implemented in NMOS technology are switched through. This directly leads to the fact that the transistor 643 is also blocked like the transistor 642. The transistors 643, 642 thus have no effect in the preparation mode. In the data mode, however, as it was discussed, the discharge transistors 640 and 641 are blocked. In the data mode, one of the nodes 22a, 22b becomes high due to fact that the switching stage switched the potential Vdd 16a either through to the node 22a or to the node 22b. For explaining the functioning of the transistors 642 and 643 it is assumed, that the node 22b is high. This leads to the fact that the transistor 642 is switched through to put the node 22a securely to the low potential Vss. Thus, it is at the same time guaranteed that the transistor 643 is blocked, which again causes the potential Vss applied to the one side of the transistor 643 not to be applied to node 22b in so far that the node 22b remains high while the node 22a securely remains low so that a clear result is obtained, i.e. that the bit SUM0 is high while the complementary bit $\overline{\text{SUM0}}$ is low.

The output stage has thus, apart from the functionality of so to speak providing the bit which is not determined by the switching stage in the data mode (due to the preceding preparation mode), also the functionality to stabilize both bits and in particular the bit not provided by the switching stage against charge leaks in the data mode.

Further, the implementation of the output stages according to FIG. 6 preferred according to the invention has the advantage that no cross currents flow, so that the half adder circuit, apart from its characteristic of area efficiency and its characteristic of high performance, also has a low current consumption.

In FIGS. 6A and 6B, further internal nodes 700-706 are plotted, which are all arranged within the switching stage and are not coupled to any defined potential in the preparation mode both on the input side and also on the output side. Preferably, for each internal node a node potential circuit is provided in order to connect the node to the reference potential in the preparation mode. Depending on the implementation, however, also already the treatment of at least some of the internal nodes will lead to an improvement compared to a circuit having completely floating internal nodes, so that the cross currents are already substantially reduced. Further, it should suffice in certain cases to treat only those internal nodes extra in the preparation mode which are especially prone to residual charges and also especially prone to coupling capacities. Thus, also in switching stages with a high number of internal nodes at least an increase of the operational security may be achieved without the transistor number of the switching stage being substantially increased by an excessive number of node potential circuits.

Figure 6C:
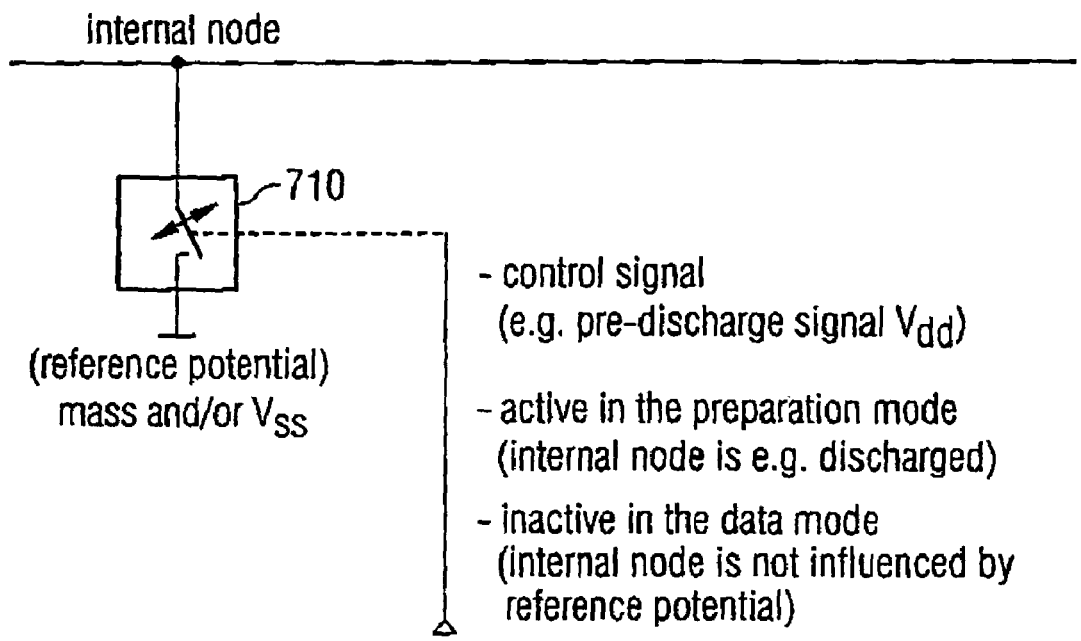
FIG. 6C shows a preferred form of a node potential circuit for coupling an internal node to the reference potential in the preparation mode.
Figure 7:
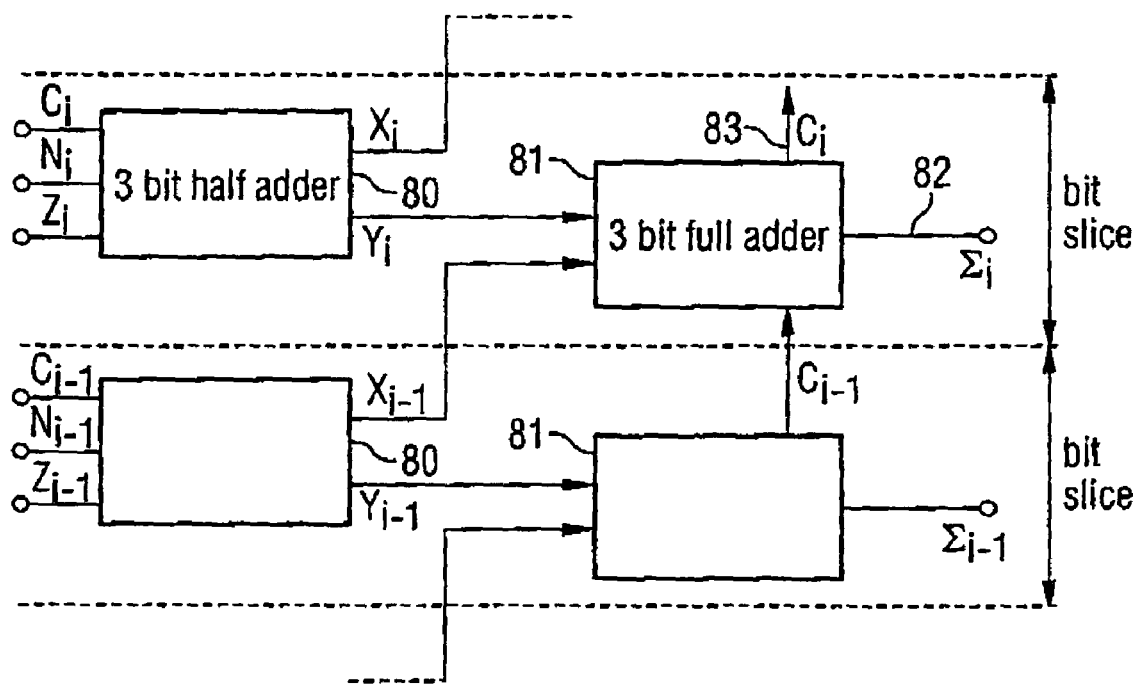
FIG. 7 shows a known three operand adder having correspondingly interconnected three-bit half adders and two-bit full adders for bit slices of a long-number calculating unit.

FIG. 6C shows a preferred node potential circuit 710 for an internal node. The node potential circuit is implemented as a switch, wherein a terminal of the switch is connected to the internal node, while the other terminal of the switch is connected to the reference potential. The control signal is applied to the control terminal of the switch. In the preferred embodiment of the present invention, the switch is implemented as an NMOS or PMOS transistor. Depending on the transistor implementation of the switch, the control signal will then, when it is active in the preparation mode, have a logically high or logically low state. This state has to be selected so that the transistor becomes conductive in its accordingly selected implementation as a PMOS or NMOS transistor in the preparation mode between source and drain, so that the node reference potential connection is obtained. In contrast, the control signal has to be selected such that the switch transistor is opened in the data mode, i.e., that the internal node does not notice the reference potential and is connected to a high or low potential according to the calculating regulation of the calculating unit and the one or several applied input operands.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A calculating unit, comprising:
    a dual rail input stage for receiving at least one input operand and for outputting the input operand in a non-inverted form at a first output of the dual rail input stage and the input operand in an inverted form at a second output of the dual rail input stage in a data mode, wherein the input stage is further implemented to bring the first and the second outputs to the same potential in a preparation mode;
    a switching stage which is implemented to switch through a calculating potential to an output of the switching stage according to a calculating regulation for an output bit depending on the at least one input operand, wherein the calculating potential at the output represents one of the output bit and an inverted version of the output bit;
    a dual rail output stage having an input connected to the output of the switching stage and having a first output and a second output, wherein in a data mode the output bit is applied to the first output of the output stage, wherein in the data mode an inverted version of the output bit is applied to the second output of the output stage, and wherein in a preparation mode, the first output and the second output of the output stage are adapted to be brought to the same preparation potential, wherein the preparation potential is different from the calculating potential,
    wherein the switching stage includes at least one internal node, which is in the preparation mode neither coupled to a potential on the first or the second input of the input stage nor to a potential on the input of the output stage; and
    a node potential circuit for coupling the internal node in the preparation mode to a reference potential and for decoupling the internal node in the data mode from the reference potential.

2. The calculating unit according to claim 1, wherein the reference potential is less than the calculating potential.

3. The calculating unit according to claim 1, wherein the node potential circuit for each internal node includes a switch which is connected between the internal node and the reference potential, wherein a control input may be provided with a control signal which is active in the preparation mode and which is inactive in the data mode.

4. The calculating unit according to claim 3, further comprising a controller to alternatingly signalize the data mode and the preparation mode for the input stage and the output stage, wherein the controller is further implemented to provide the control signal to the node potential circuit.

5. The calculating unit according to claim 1, wherein the reference potential is a ground potential so that the at least one internal node is discharged to ground potential in the preparation mode.

6. The calculating unit according to claim 1, wherein the output stage is implemented in order to discharge the first and the second output of the output stage in the preparation mode.

7. The calculating unit according to claim 1, wherein the input stage is implemented to charge the first output and the second output of the input stage to a high potential in the preparation mode.

8. The calculating unit according to claim 1, wherein coupling of the internal nodes to the reference potential results in an internal state of the switching stage being set equally in each cycle resulting in complete independence of a current profile of the input data.

9. The calculating unit according to claim 1, wherein a discharge of the internal nodes of the switching stage is performed according to a half adder regulation.

* * * * *

UNITED STATES PATENT AND TRADEMARK OFFICE
CERTIFICATE OF CORRECTION

PATENT NO. : 7,282,983 B2
APPLICATION NO. : 11/373829
DATED : October 16, 2007
INVENTOR(S) : Norbert Janssen et al.

It is certified that error appears in the above-identified patent and that said Letters Patent is hereby corrected as shown below:

At column 1, line 45, "$(X_{x-1})$," should read --$(X_{i-1})$,--

At column 3, line 55, "Zi" should read --$Z_i$--

At column 16, line 42, "As as" should read --As--

Signed and Sealed this

Twenty-fifth Day of March, 2008

JON W. DUDAS
*Director of the United States Patent and Trademark Office*